(12) United States Patent
Qiu et al.

(10) Patent No.: US 7,407,710 B2
(45) Date of Patent: Aug. 5, 2008

(54) COMPOSITION CONTAINING FLUOROALKYL SILICONE AND HYDROSILICONE

(75) Inventors: Zai-Ming Qiu, Woodbury, MN (US); Lan Hong Liu, Rosemount, MN (US); Christopher B. Walker, Jr., St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 39 days.

(21) Appl. No.: 11/279,803

(22) Filed: Apr. 14, 2006

(65) Prior Publication Data

US 2007/0254167 A1 Nov. 1, 2007

(51) Int. Cl.
*B05D 1/02* (2006.01)

(52) U.S. Cl. .................. 428/447; 525/477; 525/478

(58) Field of Classification Search .............. 525/477
See application file for complete search history.

(56) References Cited

U.S. PATENT DOCUMENTS

| | | | |
|---|---|---|---|
| 2,676,182 A | 4/1954 | Daudt et al. | |
| 2,823,218 A | 2/1958 | Speier et al. | |
| 2,915,544 A | 12/1959 | Holbrook et al. | |
| 2,970,150 A | 1/1961 | Bailey | |
| 3,159,601 A | 12/1964 | Ashby | |
| 3,159,662 A | 12/1964 | Ashby | |
| 3,220,972 A | 11/1965 | Lamoreaux | |
| 3,250,808 A | 5/1966 | Moore, Jr. et al. | |
| 3,516,946 A | 6/1970 | Modic | |
| 3,814,730 A | 6/1974 | Karstedt | |
| 4,029,629 A | 6/1977 | Jeram | |
| 4,262,072 A | 4/1981 | Wendling et al. | |
| 4,370,358 A | 1/1983 | Hayes et al. | |
| 4,455,205 A | 6/1984 | Olson et al. | |
| 4,472,480 A | 9/1984 | Olson | |
| 4,478,876 A | 10/1984 | Chung | |
| 4,486,504 A | 12/1984 | Chung | |
| 4,491,508 A | 1/1985 | Olson et al. | |
| 4,504,645 A | 3/1985 | Melancon | |
| 4,510,094 A | 4/1985 | Drahnak | |
| 4,530,879 A | 7/1985 | Drahnak | |
| 4,533,575 A | 8/1985 | Melancon | |
| 4,584,355 A | 4/1986 | Blizzard et al. | |
| 4,585,836 A | 4/1986 | Homan et al. | |
| 4,591,622 A | 5/1986 | Blizzard et al. | |
| 4,600,484 A | 7/1986 | Drahnak | |
| 4,603,168 A * | 7/1986 | Sasaki et al. .......... | 522/18 |
| 4,654,233 A | 3/1987 | Grant et al. | |
| 4,707,531 A | 11/1987 | Shirahata | |
| 4,855,184 A | 8/1989 | Klun et al. | |
| 4,873,140 A | 10/1989 | McIntyre | |
| 4,980,440 A | 12/1990 | Kendziorski et al. | |
| 4,980,443 A | 12/1990 | Kendziorski et al. | |
| 4,985,526 A | 1/1991 | Kishita et al. | |
| 5,126,394 A | 6/1992 | Revis et al. | |
| 5,145,886 A | 9/1992 | Oxman et al. | |
| 5,145,933 A | 9/1992 | Grisoni et al. | |
| 5,258,225 A | 11/1993 | Katsamberis | |
| 5,300,670 A | 4/1994 | Kobayashi | |
| 5,310,843 A | 5/1994 | Morita | |
| 5,349,004 A | 9/1994 | Kumar et al. | |
| 5,356,719 A | 10/1994 | Hamada et al. | |
| 5,359,113 A | 10/1994 | Bank | |
| 5,482,991 A | 1/1996 | Kumar et al. | |
| 5,486,421 A | 1/1996 | Kobayashi | |
| 5,492,969 A | 2/1996 | Hamada et al. | |
| 5,519,082 A | 5/1996 | Yoshino | |
| 5,539,016 A | 7/1996 | Kunzler et al. | |
| 5,578,381 A | 11/1996 | Hamada et al. | |
| 5,648,407 A | 7/1997 | Goetz et al. | |
| 5,677,050 A | 10/1997 | Bilkadi et al. | |
| 5,688,884 A | 11/1997 | Baker et al. | |
| 5,696,211 A * | 12/1997 | Chung et al. ............. | 525/478 |
| 5,741,552 A | 4/1998 | Takayama et al. | |
| 5,834,612 A | 11/1998 | Furukawa et al. | |
| 5,834,614 A | 11/1998 | Furukawa et al. | |
| 5,882,774 A | 3/1999 | Jonza et al. | |
| 5,973,021 A * | 10/1999 | Beck et al. ............... | 522/40 |
| 6,132,861 A | 10/2000 | Kang et al. | |
| 6,194,481 B1 | 2/2001 | Furman et al. | |
| 6,204,350 B1 | 3/2001 | Liu et al. | |

(Continued)

FOREIGN PATENT DOCUMENTS

EP  0 699 725 A1  3/1996

(Continued)

OTHER PUBLICATIONS

Speier et al., "The Addition of Silicon Hydrides to Olefinic Double Bonds. Part II. The Use of Group VIII Metal Catalysts", Journal of American Chemical Society, (Feb. 20, 1957), pp. 974-979. vol. 79.

(Continued)

*Primary Examiner*—Randy Gulakowski
*Assistant Examiner*—Robert Loewe
(74) *Attorney, Agent, or Firm*—Kent S. Kokko

(57) ABSTRACT

Described is a free-radically curable composition comprising a fluoroalkyl silicone having at least two ethylenically unsaturated groups, silicone having at least two Si—H, a polyethylenically unsaturated component having at least two ethylenically unsaturated groups, a hydrosilylation catalyst, and a free radical initiator.

27 Claims, No Drawings

U.S. PATENT DOCUMENTS

| | | | |
|---|---|---|---|
| 6,224,949 B1 | 5/2001 | Wright et al. | |
| 6,238,798 B1 | 5/2001 | Kang et al. | |
| 6,245,833 B1 | 6/2001 | Kang et al. | |
| 6,299,799 B1 | 10/2001 | Craig et al. | |
| 6,329,058 B1 | 12/2001 | Arney et al. | |
| 6,353,037 B1 | 3/2002 | Thunhorst et al. | |
| 6,368,699 B1 | 4/2002 | Gilbert et al. | |
| 6,376,569 B1 | 4/2002 | Oxman et al. | |
| 6,376,572 B1 | 4/2002 | Turri | |
| 6,376,576 B2 | 4/2002 | Kang et al. | |
| 6,451,869 B1 | 9/2002 | Butts | |
| 6,462,100 B1 | 10/2002 | Thunhorst et al. | |
| 6,497,961 B2 | 12/2002 | Kang et al. | |
| 6,592,659 B1 | 7/2003 | Terrazas et al. | |
| 6,730,388 B2 | 5/2004 | MacQueen et al. | |
| 6,841,190 B2 | 1/2005 | Liu et al. | |
| 6,844,950 B2 * | 1/2005 | Ja Chisholm et al. | 359/107 |
| 6,846,513 B2 | 1/2005 | Furusawa et al. | |
| 7,279,210 B2 | 10/2007 | Hulteen et al. | |
| 2002/0128336 A1 | 9/2002 | Kolb et al. | |
| 2003/0012936 A1 | 1/2003 | Draheim et al. | |
| 2003/0217806 A1 | 11/2003 | Tait et al. | |
| 2004/0184150 A1 | 9/2004 | Johnson et al. | |
| 2005/0038183 A1 * | 2/2005 | Ahn et al. | 524/861 |
| 2005/0249940 A1 | 11/2005 | Klun et al. | |
| 2005/0249942 A1 | 11/2005 | Coggio et al. | |
| 2005/0260414 A1 | 11/2005 | MacQueen | |
| 2006/0014915 A1 | 1/2006 | Ahn et al. | |
| 2006/0147674 A1 | 7/2006 | Walker, Jr. et al. | |
| 2006/0147723 A1 | 7/2006 | Jing et al. | |
| 2006/0147724 A1 | 7/2006 | Mizuno | |
| 2006/0148350 A1 | 7/2006 | Chang et al. | |
| 2006/0148950 A1 | 7/2006 | Davidson et al. | |
| 2006/0216524 A1 | 9/2006 | Klun et al. | |
| 2007/0014018 A1 | 1/2007 | Wheatley et al. | |

FOREIGN PATENT DOCUMENTS

| | | |
|---|---|---|
| EP | 0 850 999 A2 | 7/1998 |
| EP | 0 850 999 A3 | 12/1998 |
| JP | 4-252229 | 9/1992 |
| JP | 5-311063 | 11/1993 |
| JP | 9-286912 | 11/1997 |
| WO | WO 95/17303 A1 | 6/1995 |
| WO | WO 99/39224 A1 | 5/1999 |
| WO | WO 99/57185 A1 | 11/1999 |
| WO | WO 2006/074033 A1 | 7/2006 |
| WO | WO 2006/077507 A1 | 7/2006 |

OTHER PUBLICATIONS

"Preparation, Properties, and Industrial Applications of Organofluorine Compound", (1982), p. 26 Ellis Horwood Ltd., West Sussex, England.

Ojima et al., "Hydrosilylation of α,β-Unsaturated Nitriles and Esters Catalyzed by Tris (Triphenylphosphine) Chlororhodium", Journal of Organometallic Chemistry, (1976), pp. 43-60, vol. 111, Elsevier Sequoia S.A., Lausanne.

Takeshita et al., "The Catalyzed Reaction of α,β-Unsaturated Esters with Various Hydrosilanes", Journal of American Chemical Society, (1987), pp. 4864-4868, vol. 52, No. 22, American Chemical Society.

Bongiovanni et al., "Perfluoropolyether structures as surface modifying agents of UV-curable systems" Macromol. Chem. Phys. ,(1998), pp. 1099-1105, vol. 199, Hüthig & Wepf Verlag, Zug.

Ameduri et al., "New Fluorinated Acrylic Monomers for the Surface Modification of UV-Curable Systems", Journal of Polymer Science, Part A: Polymer Chemistry,(1999), pp. 77-87. vol. 37, John Wiley & Sons, Inc.

Bongiovanni et al., "High performance UV-cured coatings containing fluorinated monomers", Pigment & Resin Technology, (1999), pp. 26-30, vol. 28, No. 1, MCB University Press.

Bongiovanni et al., "UV-Curing of Fluorinated Systems: Synthesis and Properties", ACS Symp. Ser., (2003), pp. 499-510, vol. 849, American Chemical Society.

Tarrant et al., " The Preparation of Some Fluoroalkylmethyldichlorosilanes and their Hydrolysis Products", Journal of American Chemical Society, (1957), pp. 6536-6540, vol. 79., American Chemical Society.

Geyer et al., "Polyfluoroalkyl Compounds of Silicon. Part IV. Polyfluoroalkyl-silanes, -silicones, and -polysiloxanes derived from Perfluoroalkylethylenes or Vinylsilanes", Journal of American Chemical Society, (1957), pp. 4472-4479. American Chemical Society.

Kim et al., "Isomeric 2,4,6,-Tris(3,3,4,4,5,5,6,6,6-nonafluorohexyl)-2,4,6-trimethylcyclotrisiloxanes" Journal of Organometallic Chemistry, (1973), pp. 1615-1616, vol. 38, No. 8.

Beyou et al., "A Convenient Approach to Perfluorinated Organosilicons. Preparation of a Fluorinated Polysiloxane Precursor", Tetrahedron Letters, (1995), pp. 1843-1844, vol. 36, No. 11, Elsevier Science Ltd.

Robinson et al., "Transition Metal-Carbon Bonds. Part III. Cyclopentadienyltrimethylplatinum(IV)", Journal of American Chemical Society, (1965) pp. 1529-1530, American Chemical Society.

U.S. Appl. No. 60/640,471, filed Dec. 30, 2001 entitled "Stain-resistant Fluorochemical Compositions", (corresponding to WO2006/074033 A1).

U.S. Appl. No. 60/585,460, filed Jul. 1, 2004 entitled "Hardcoat Compositions and Methods", (corresponding to WO2006/007507 A1).

U.S. Appl. No. 11/239,455, filed Sep. 7, 2005 entitled "Curable Compositions, Methods of Making and Using the Same, and Articles Therefrom", (corresponding to US 7,279,210).

U.S. Appl. No. 11/279,800, filed Apr. 14, 2006 entitled "Curable Fluoroalkyl Silicone Composition".

U.S. Appl. No. 11/279,813, filed Apr. 14, 2006 entitled "Curable Composition Containing Fluoroalkyl Hydrosilicone".

* cited by examiner

COMPOSITION CONTAINING FLUOROALKYL SILICONE AND HYDROSILICONE

FIELD OF THE INVENTION

The present invention relates to a curable fluoroalkyl silicone composition and to articles having a protective coating thereof.

BACKGROUND

Certain commonly used materials, such as optical displays, textiles, metals, stone, wood, leather, etc, are susceptible to scratches, abrasion, and soiling during routine use. In some instances, protective films or coatings may be applied to the surfaces of these materials in order to provide protection and enhance durability, performance and appearance.

UV-curable systems based on the polymerization of an acrylic resin have been used as protective coating compositions for a variety of surfaces. In some instances, it may be desirable to modify or enhance the performance of these coatings by introducing particular structures, such as fluorinated groups, into the polymeric network. Fluorinated groups can be incorporated into these compositions through the copolymerization of the acrylic resin with a low amount (<1%, w/w) of a fluorinated monomer, such as a fluorinated acrylate compound.

U.S. Pat. No. 6,132,861 (Kang et al. '861); U.S. Pat. No. 6,238,798 B1 (Kang et al. '798); U.S. Pat. No. 6,245,833 B1 (Kang et al. '833); U.S. Pat. No. 6,299,799 (Craig et al.) and Published PCT Application No. WO 99/57185 (Huang et al.) describes ceramer compositions containing blends of colloidal inorganic oxide particles, a curable binder precursor and certain fluorochemical compounds. These compositions are described as providing stain and abrasion resistant hardcoats in a single layer coating.

U.S. Pub. Appln. No. 2006/0014915 describes a composition comprising a non-fluorinated polyorganosiloxane fluid having an average of at least two unsaturated organic groups per molecule and a non-fluorinated crosslinking agent having an average of at least two silicon-bonded hydrogen atoms per molecule; a hydrosilylation catalyst; and a fluoroorganosilicone.

Although various protective coatings have been developed using fluorinated polymers, a need remains for improved coating compositions with better performance and longevity than existing systems.

SUMMARY

The present invention provides a free-radically curable composition comprising:
a) 51 to 99.5 parts by weight of a polyethylenically unsaturated component having at least two ethylenically unsaturated groups,
b) a fluoroalkyl silicone having at least two ethylenically unsaturated groups,
c) a hydrosilicone having at least two Si—H groups, the total of b) and c) being 1 to 49 parts by weight;
d) a hydrosilylation catalyst, and
e) a free radical polymerization catalyst.

Generally, the hydrosilicone c) is present in an amount such that the molar ratio of Si—H groups is less than the molar amount of ethylenically unsaturated groups of said fluoroalkyl silicone b) and the ethylenically unsaturated groups of the polyethylenically unsaturated component a).

The hydrosilicone may hydrosilylate the unsaturated groups of either component a) and/or b), but there should be sufficient unsaturated groups remaining after hydrosilylation for subsequent free radical curing.

In another embodiment the curable composition comprises 1 to 49 parts by weight of the hydrosilylation reaction product of the fluoroalkyl silicone having at least two ethylenically unsaturated groups, and a hydrosilicone having at least two Si—H groups. Generally the hydrosilicone is present in an amount such that the molar ratio of Si—H groups is less than or equal to the molar amount of ethylenically unsaturated groups of said fluoroalkyl silicone.

The polyethylenically unsaturated component may comprise an organic compound having a plurality of ethylenically unsaturated groups, or may comprise a surface-functionalized inorganic particle having a plurality of ethylenically unsaturated groups. The fluoroalkyl silicone may have terminal ethylenically unsaturated groups, pendent (i.e. in-chain ethylenically unsaturated groups), or a combination thereof. Optionally, the curable composition may further comprise a mono (meth)acryloyl compound having a functional group.

In another embodiment the invention provides a coated article comprising the cured coating of the invention. The curable composition may be used to prepare hard surface coatings on a variety of substrates, providing a durable, low surface energy, solvent resistant, water-, marker- and stain-repellent surface.

Definitions

As used herein the term "(meth)acryloyl" includes both acryloyl and methacryloyl groups/compounds. In at least some embodiments, acrylate groups are preferred. As used herein, (meth)acryl groups includes those class of compounds such as (meth)acrylate esters, (meth)acrylamides, and N-alkyl (meth)acrylamides.

By "polyethylenically unsaturated" it is meant a compound or component having a plurality of ethylenically unsaturated groups, such as a plurality of vinyl and (meth)acryloyl groups.

By "poly(meth)acryloyl" it is meant a compound or component having a plurality of (meth)acryloyl groups, such as a plurality of acrylate groups By "hardcoat" or "topcoat" is meant a free-radically cured composition that optionally comprises inorganic additives.

By "low surface energy" is meant that the surface layer of the articles described herein preferably exhibits a static or dynamic contact angle with water of at least 70°. More preferably the contact angle with water is at least 80° and even more preferably at least 90° (e.g. at least 95°, at least 100°). Low surface energy is indicative of anti-soiling properties as well as the surface being easy to clean. As yet another indication of low surface energy, ink from a commercially available marker preferably beads up. Further, the surface layer and articles described herein exhibit "ink repellency", meaning that the ink can easily be removed by wiping with a commercially available tissue.

The recitation herein of numerical ranges by endpoints includes all numbers subsumed within that range (e.g., 1 to 5 includes 1, 1.5, 2, 2.75, 3, 3.80, 4 and 5). As used in this specification and the appended claims, the singular forms "a", "an", and "the" also include the plural forms unless the context clearly dictates otherwise. Thus, for example, reference to a composition containing "a compound" includes a mixture of two or more compounds. In addition, the term "or" is generally used in the sense of "and/or" unless the context clearly dictates otherwise.

Unless otherwise indicated, all numbers expressing quantities of ingredients, measurement of properties such as surface energy, contact angles, and so forth used in the instant specification and claims are to be understood as being modified in all instances by the term "about." Accordingly, unless indicated to the contrary, the numerical parameters set forth in the specification and attached claims are approximations that can vary depending upon the desired properties sought by those skilled in the art utilizing the teachings of the present invention. At the very least, and not as an attempt to limit the application of the doctrine of equivalents to the scope of the claims, each numerical parameter should at least be construed in light of the number of reported significant digits by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors and uncertainties necessarily resulting from the standard deviations found in their respective testing measurements.

DETAILED DESCRIPTION

The first component of the curable composition may comprise an organic polyethylenically unsaturated component having two or more ethylenically unsaturated, polymerizable groups. The polyethylenically unsaturated component is of the formula $R^4(Z')_p$, wherein $R^4$ is a organic moiety of valency p, p is at least 2, and Z' is an ethylenically unsaturated polymerizable group, reactive with said ethylenically unsaturated group of said fluoroalkyl silicone. Preferably, the $R^4$ moiety is a hydrocarbyl group (containing just carbon and hydrogen), and most preferably, the $R^4$ moiety is a linear, branched, cyclic or acyclic non-urethane aliphatic group.

The ethylenically unsaturated group Z' may include alkenyl groups, such as vinyl, allyl, and butentyl; alkynyl groups such as ethynyl, propynyl and butynyl, vinyloxyalkylene (e.g. $CH_2=CHO-C_mH_{2m}-$), allyloxyalkylene, (e.g. $CH_2=CHCH_2O-C_mH_{2m}-$), and (meth)acryloyl groups, (e.g. $CH_2=CR"CO_2-C_mH_{2m}-$, $R"=H, C_1-C_4$ alkyl, F, and nitrogen analogues thereof) where m is an integer of 1 to 12. Preferably the Z' group of the polyethylenically unsaturated component is a (meth)acryloyl group.

A wide variety of (meth)acryloyl compounds can be used in the coating compositions, such as, for example, di(meth)acryloyl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate; higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; oligomeric (meth)acryl compounds such as, for example, polyester acrylates, epoxy acrylates; polyacrylamide analogues of the foregoing; and combinations thereof.

Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

Preferred commercially available (meth)acryloyl compounds include those available from Sartomer Company, Exton, Pa. such as tripropyleneglycol diacrylate available under the trade designation "SR306", trimethylolpropane triacrylate available under the trade designation "SR351", pentaerythritol triacrylate available under the trade designation "SR444", dipentaerythritol pentaacrylate available under the trade designation "SR399LV", ethoxylated (3) trimethylolpropane triacrylate available under the trade designation "SR454", and ethoxylated (4) pentaerythritol triacrylate, available under the trade designation "SR494", and combinations thereof.

Although as little as 5 parts by weight of the organic polyethylenically unsaturated component (relative to 100 parts by weight of the organic polyethylenically unsaturated component and fluoroalkyl silicone) may result in suitable durability for some applications, it is typically preferred to maximize the concentration, particularly since these compounds are generally less expensive than fluorinated compounds. Accordingly, the coating compositions described herein typically comprise at greater than 50 parts by weight organic polyethylenically unsaturated component. In some implementations the total amount of organic polyethylenically unsaturated component may comprise greater than 60 parts by weight, at least 70 parts by weight, at least 80 parts by weight, at least 90 parts by weight and even about 99.5 parts by weight of the coating composition Alternatively, the polyethylenically unsaturated component may comprise surface functionalized inorganic particles, preferably nanoparticles (having an average particle size of less than 100 nanometers) having a plurality of polyethylenically unsaturated groups. These particles and nanoparticles are prepared from colloidal materials from the group of silica, zinc oxide, titania, alumina, zirconia, vanadia, chromia, iron oxide, antimony oxide, tin oxide, other colloidal metal oxides, and mixtures thereof, functionalized such that (a) the particles disperse in the curable composition and (b) the ethylenically unsaturated groups attached to the particle are capable of polymerization; these particles can comprise essentially a single oxide such as silica or can comprise a core of an oxide of one type (or a core of a material) on which is deposited the oxide of another type. The particles have an average particle diameter of 5 to about 1000 nm, preferably less than 100 nanometers, more preferably 10 to 50 nm.

Average particle size can be measured using transmission electron microscopy to count the number of particles of a given diameter. Additional examples of suitable colloidal silicas are described in U.S. Pat. No. 5,126,394, incorporated herein by reference.

Such particles are described in U.S. Pat. Nos. 6,353,037, and 6,462,100 (Thunhorst et al.), and U.S. Pat. No. 6,329,058 (Arney et al.) and are incorporated herein by reference. Other useful surface modified particles are described in published application US 2002/0128336 (Baran et al.) incorporated herein by reference.

Preferably the particles are (meth)acryloyl functionalized inorganic particles, i.e. functionalized with a plurality of (meth)acryloyl groups. Typically the silica particles are functionalized by adding a silylacrylate to aqueous colloidal silica. Examples of acrylate functionalized colloidal silica are described in U.S. Pat. Nos. 4,491,508 and 4,455,205 to Olsen et al.; U.S. Pat. Nos. 4,478,876 and 4,486,504 to Chung; and U.S. Pat. No. 5,258,225 to Katsamberis, all of which are herein incorporated by reference.

The polyethylenically unsaturated inorganic particles may substitute for all or a part of the organic polyethylenically unsaturated component, i.e. the curable composition may comprise a fluoroalkyl silicone having at least two ethylenically unsaturated groups, an polyethylenically unsaturated functionalized particle component, and a free radical initiator. Generally, the total amount of ethylenically unsaturated component, whether an organic compound, or a surface functionalized inorganic particle component, or a combination thereof, is greater than 50 parts by weight, i.e. 51 to 99.5 parts by weight.

The composition further comprises of a fluoroalkyl silicone having at least two ethylenically unsaturated groups, and may comprise the hydrosilylation reaction product thereof with a hydrosilicone having at least two Si—H groups. Generally the hydrosilicone is present in amounts such that the molar ratio of Si—H groups is less than the molar amount of ethylenically unsaturated groups of said fluoroalkyl silicone having at least two ethylenically unsaturated groups and the ethylenically unsaturated groups of the polyethylenically unsaturated component.

The coating composition described herein also comprises at least one fluoroalkyl silicone compound. The total amount of fluoroalkyl silicone compound and the hydrosilicone having at least two Si—H groups in the coating composition that is cured to form the coating is typically at least 0.5 parts by weight. In some embodiments, the coating composition may contain as much as 49 parts by weight, based on 100 parts by weight of polyethylenically unsaturated component plus fluoroalkyl silicone compound plus the silicone having at least two Si—H groups. However, it is generally more cost effective to employ a minimal concentration of the fluoroalkyl silicone compound that provide the desired low surface energy. Accordingly, the total amount of fluoroalkyl silicone compound(s) provided in the coating composition typically does not exceed 20 parts by weight.

The fluoroalkyl silicone compound is any compound represented by the following formula:

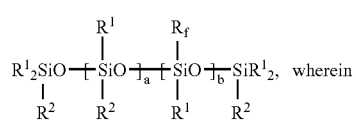

Formula I $R^1$ is a monovalent, hydrocarbyl organic group, including aliphatic and aromatic groups;

$R^2$ is $R^1$ or an ethylenically unsaturated group Z;

$R_f$ is a fluoroalkyl group;

a is 0 to 2000 b is 1 to 2000;

a+b is at least 10, preferably at least 50, wherein at least two of said $R^2$ groups are an ethylenically unsaturated group Z.

With respect to Formula I, the fluoroalkyl silicone may comprise compounds having at least two terminal ethylenically unsaturated groups, represented by the formula:

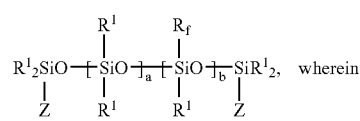

Formula II $R^1$ is a monovalent, hydrocarbyl organic group, including aliphatic and aromatic groups;

Z is an ethylenically unsaturated group;

$R_f$ is a fluoroalkyl group;

a is 0 to 2000 b is 1 to 2000; and a+b is at least 10, preferably at least 50.

The fluoroalkyl silicone may comprise compounds having at least two pendent ethylenically unsaturated groups, represented by the formula:

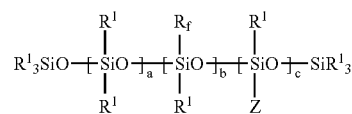

Formula III wherein Z is an ethylenically unsaturated group, $R^1$ is a monovalent, hydrocarbyl organic group, including aliphatic and aromatic groups;

$R^2$ is $R^1$ or an ethylenically unsaturated group Z;

$R_f$ is a fluoroalkyl group;

a is 0 to 2000 b is 1 to 2000;

c is 2 to 2000; and a+b+c is at least 10, preferably at least 50.

With respect to Formulas I, II and III, it will be understood the illustrated polymers may be random or block copolymers. The number of silicone units, represented by integers a, b and c is generally at least ten, at preferably at least 50. Any of the fluoroalkyl silicones may further comprise optional $R^1_3SiO_{1/2}$ units, $SiO_{4/2}$ units, $R^1SiO_{3/2}$ units and $R^1_2SiO_{2/2}$ units, or a combination thereof.

The fluoroalkyl group, $R_f$, of the fluoroalkyl silicone compounds may be of the formulas $C_nF_{2n+1}(CH_2O)_dC_mH_{2m}$—, or $C_nF_{2n+1}CHXCF_2(C_mH_{2m}O)_dC_pH_{2p}$— or $C_nF_{2n+1}OCHXCF_2(C_mH_{2m}O)_dC_pH_{2p}$— where X is H or F, n is an integer of 1 to 12, m is an integer of 1 to 12, d is 0 or 1, and p is an integer of 2 to 12. Preferably, n is an integer of 3 to 6. The size of the fluoroalkyl group, and the number of fluoroalkyl groups, is chosen such that the cured coating has at least 10 wt. %, preferably at least 20 wt. %, fluorine.

Representative examples of fluoroalkyl groups are $CF_3CH_2CH_2$—, $CF_3CF_2CF_2CF_2CH_2CH_2$—, $(CF_3)_2NCF_2CF_2CH_2CH_2$—, $CF_3CH_2OCH_2CH_2$—, CF₃CF₂CH₂OCH₂CH₂—, CF₃CFHCF₂CH₂OCH₂CH₂—, CF₃CFHCF₂OCH₂CH₂—, and CF₃CF₂CF₂CF₂CH₂CF₂CH₂CH₂—.

It has been reported that certain perfluorooctyl-containing compounds (C₈F₁₇—) may tend to bio-accumulate in living organisms; this tendency has been cited as a potential concern regarding some fluorochemical compositions. For example, see U.S. Pat. No. 5,688,884 (Baker et al.). As a result, there is a desire for fluorine-containing compositions effective in providing desired functional properties, e.g., water- and oil-repellency, surfactant properties, etc. while eliminating more effectively from biological systems.

The present compositions provide additional advantages. First, the coating compositions containing the shorter (i.e. C₃ to C₆) fluoroalkyl groups may be produced at a lower cost per weight because of higher yields while maintaining their potency as effective low surface energy coatings at the same weight basis. For example, the heptafluorobutyryl fluoride precursor may be prepared in yields of 60% as compared to perfluoro-octanoyl fluoride precursor (31%) in an electrochemical fluorination process (*Preparation Properties and Industrial Applications of Organofluorine Compounds*, edited by R. E. Banks, Ellis Horwood Ltd (1982), p 26). Furthermore, the short chain carboxylic acids (the presumed intermediate degradation products) are less toxic and less bioaccumulative than the longer chain homologues.

The monovalent organic groups represented by $R^1$ may have 1 to 20 carbon atoms, alternatively 1 to 10 carbon atoms. Examples of monovalent organic groups include, but are not limited to, monovalent hydrocarbon groups. Monovalent hydrocarbon groups include, but are not limited to, alkyl such as methyl, ethyl, propyl, pentyl, octyl, undecyl, and octadecyl; cycloalkyl such as cyclohexyl, and aromatic groups (aryl) such as phenyl, tolyl, and napthyl.

The ethylenically unsaturated group Z may include alkenyl groups, such as vinyl, allyl, and butentyl; alkynyl groups such as ethynyl, propynyl and butynyl, vinyloxyalkylene (e.g. $CH_2=CHO—C_mH_{2m}—$), allyloxyalkylene (e.g. $CH_2=CHCH_2O—C_mH_{2m}—$), and (meth)acryloyl groups, where m is an integer of 1 to 12. Preferably the Z group of the fluoroalkyl silicone is a vinyl group.

The fluoroalkyl silicone is exemplified by dimethylvinylsiloxy-terminated poly(methyl-3,3,3-trifluoropropylsiloxane); dimethylvinylsiloxy-terminated poly(dimethylsiloxane/methyl-6,6,6,5,5,4,4,3,3-nonafluorohexylsiloxane); dimethylvinylsiloxy-terminated poly(dimethylsiloxane/methyl-vinylsiloxane/methyl-6,6,6,5,5,4,4,3,3-nonafluorohexylsiloxane); dimethylvinylsiloxy-terminated poly(dimethylsiloxane/methyl-3,3,3-trifluoropropylsiloxane); dimethylvinylsiloxy-terminated poly(methyl-6,6,6,5,5,4,4,3,3-nonafluorohexylsiloxane); dimethylvinylsiloxy-terminated poly(dimethylsiloxane/methyl-vinylsiloxane/methyl-3,3,3-trifluoropropylsiloxane); trimethylsiloxy-terminated poly(dimethylsiloxane/methylvinylsiloxane/methyl-6,6,6,5,5,4,4,3,3-nonafluorohexylsiloxane); trimethylsiloxyterminated poly(dimethylsiloxane/methyl-3,3,3-trifluoropropylsiloxane/methylvinylsiloxane); trimethylsiloxy-terminated poly(methyl-vinylsiloxane/methyl-6,6,6,5,5,4,4,3,3-nonafluorohexylsiloxane); trimethylsiloxy-terminated poly(methylvinylsiloxane/methyl-3,3,3-trifluoropropylsiloxane); or combinations thereof.

The fluoroalkyl silicones are known to the art and may be prepared by several routes. By one method, a fluoroalkyl vinyl compound is hydrosilylated with a dichloroalkyl silane, treated with water to form oligomers or low molecule weight polymer or the cylic trimer or tetramer, and then the cyclic trimer or tetramer can be polymerized (optionally with the cyclic trimer or tetramer of a dialkyl siloxane) to form the higher molecule weight fluoroalkyl silicone with selected terminal groups, as shown below:

$RfCH=CH_2 \rightarrow R_fCH_2CH_2SiMeCl_2 \rightarrow$
cyclic trimer or tetramer of $R_fCH_2CH_2SiMeO_{2/2}$
$\rightarrow —(SiMe(C_2H_4R_f)—O)_n—$,
or copolymer with cyclic trimer or tetramer of $Me_2SiO_{2/2}$
$\rightarrow —(SiMe(C_2H_4R_f)—O)_n—(SiMe_2-O)_m—$.

Another major route is the hydrolysis from $R_fCH_2CH_2SiMe(OMe)_2$ with or without other RSiMe(OMe)₂, followed by dehydration to the polymer.

Other methods for preparing fluoroalkyl silicones and intermediates are described in many literatures, such as U.S. Pat. No. 2,915,544 (Holbrook et al.), P. Tarrant et al., J. Am. Chem. Soc., vol. 79, pp. 6536-6540, 1957; A. M. Geyer et al., J. Chem. Soc., pp. 4472-9, 1957; Y. K. Kim et al., J. Org. Chem., vol. 38, pp 1615-6, 1973; and E. Beyou et al., Tet. Letters, vol. 36(11), pp. 1843-4, 1995.

Further, the fluoroalkyl silicone may be produced by the silica hydrosol capping process of Daudt et al. with alkenyl-containing endblocking reagents. The method of Daudt et al., is disclosed in U.S. Pat. No. 2,676,182. Briefly stated, the method of Daudt et al. involves reacting a silica hydrosol under acidic conditions with a hydrolyzable triorganosilane such as trimethylchlorosilane, a siloxane such as hexamethyldisiloxane, or mixtures thereof, and recovering a copolymer having units derived therefrom. The resulting copolymers generally contain from 2 to 5 percent by weight of hydroxyl groups.

The fluoroalkyl silicone, which typically contains less than 2 percent by weight of silicon-bonded hydroxyl groups, may be prepared by reacting the product of Daudt et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare the resin.

Commercially available silicones having a plurality of vinyl groups include a vinyl-terminated fluorosilicone that is commercially available under the trade designations "SYL-OFF Q2-7785" from Dow Corning Corp.

The fluoroalkyl silicone can be a single fluid or a combination comprising two or more fluoroalkyl silicone fluids that differ in at least one of the following properties: structure, viscosity, average molecular weight, siloxane units, and sequence.

The composition further comprises a hydrosilicone having at least two Si—H groups (hydrosilicone) in an amount such that the molar ratio of Si—H groups is less than the molar amount of ethylenically unsaturated groups of said fluoroalkyl silicone and the ethylenically unsaturated groups of the polyethylenically unsaturated component. In certain embodiments, the hydrosilicone is present in an amount such that the molar ratio of Si—H groups is less than or equal to the molar amount of ethylenically unsaturated groups of said fluoroalkyl silicone. In certain embodiments the composition comprises the hydrosilylation reaction products of a fluoroalkyl silicone having at least two ethylenically unsaturated groups, and the hydrosilicone having at least two Si—H groups. The Si—H groups may be terminal, pendent, or a combination thereof.

The hydrosilicone having a plurality of Si—H groups is of the general formula:

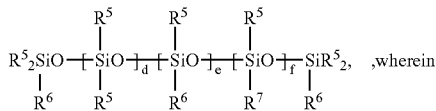 Formula IV

,wherein $R^5$ is a monovalent, hydrocarbyl organic group, including aliphatic and aromatic groups,
$R^6$ is H or $R^5$,
$R^7$ is $R_f$ or $R^5$, where $R_f$ is a fluoroalkyl group,
d is 0 to 2000
e is 1 to 2000
f is 0 to 2000,
and d+e+f is at least 10, preferably at least 20, with the proviso that at least two of the $R^6$ groups are H.

In one embodiment, the hydrosilicone has a plurality of terminal Si—H groups as in the formula:

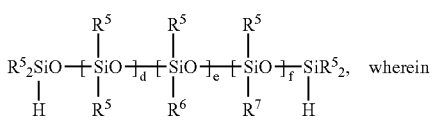 Formula V wherein $R^5$ is a monovalent, hydrocarbyl organic group, including aliphatic and aromatic groups,
$R^6$ is H or $R^5$,
$R^7$ is $R_f$ or $R^5$, where $R_f$ is a fluoroalkyl group,
d is 0 to 2000
e is 0 to 2000
f is 0 to 2000, and d+e+f is at least 10, preferably at least 20.

In another embodiment the hydrosilicone has a plurality of pendent Si—H groups as in the formula:

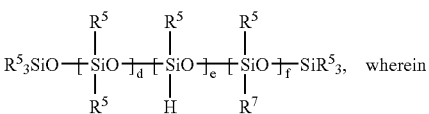 Formula VI wherein $R^5$ is a monovalent, hydrocarbyl organic group, including aliphatic and aromatic groups,
$R^7$ is $R_f$ or $R^5$, where $R_f$ is a fluoroalkyl group,
d is 0 to 2000
e is 2 to 2000
f is 0 to 2000, and d+e+f is at least 10, preferably at least 20.

In another embodiment the hydrosilicone has a plurality of pendent fluoroalkyl groups, $R_f$ as in the formula:

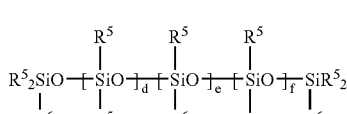 Formula VII wherein
$R^5$ is a monovalent, hydrocarbyl organic group, including aliphatic and aromatic groups, $R^6$ is H or $R^5$,
d is 0 to 2000
e is 2 to 2000
f is 1 to 2000, and d+e+f is at least 10, preferably at least 20, and at least two of $R^6$ groups are H.

Non-fluorinated hydrosilicone compounds (having at least two Si—H groups) are known and exemplified by H—SiMe$_2$—(O—SiMe$_2$)n-OSiMe$_2$-H (CAS# 70900-21-9); Me$_3$Si—O—(SiHMe—O)n-(SiMe$_2$-O)m-SiMe$_3$ (CAS# 68037-59-2); H-SiMe$_2$-O—(SiHMe$_2$-O)n-(SiMe$_2$—O)m-SiMe$_2$-H(CAS# 69013-23-6); Me$_3$Si—O—(SiHMe$_2$-O)n-SiMe$_3$ (CAS# 63148-57-2); Et$_3$Si—O—(SiHEt-O)n-SiEt$_3$ (CAS# 24979-95-1); H—SiMe$_2$-O—(SiPh(OSiHMe$_2$)—O)n-SiMe$_2$—H; H—SiMe$_2$-O—(SiHMe—O)n-(SiMePh—O)m-SiMe$_2$-H (CAS# 115487-49-5); and —(SiHMe—O)n-(SiMeC$_8$H$_{17}$—O)m- (CAS# 68554-69-8).

Fluorinated hydrosilicone compounds (having at least two Si—H groups) are known and exemplified by H-SiMe$_2$-O—(SiMeH—O)n-(SiMeC$_2$H$_4$CF$_3$—O)m-SiMe$_2$-H, H—SiMe$_2$-O—(SiMeH—O)n-(SiMeC$_2$H$_4$C$_4$F$_9$—O)m-SiMe$_2$-H; H—SiEt$_2$—O—(SiEtH—O)n-(SiMeC$_2$H$_4$CF$_3$—O)m-SiEt$_2$—H; H—SiEt$_2$—O—(SiEtH—O)n-(SiMeC$_2$H$_4$C$_4$F$_9$—O)m-SiEt$_2$—H; H—SiMe$_2$-O—(SiMeH—O)n-(SiMeC$_2$H$_4$CF$_3$—O)m-(SiMe$_2$-O)O—SiMe$_2$-H; H—SiMe$_2$-O—(SiMeH—O)n-(SiMeC$_2$H$_4$C$_4$F$_9$—O)m-(SiMe$_2$-O)e-SiMe$_2$-H; H—SiMe$_2$-O—(SiMeH—O)n-(SiMeC$_2$H$_4$CF$_3$—O)m-(SiMePh—O)O—SiMe$_2$-H; H—SiMe$_2$-O—(SiMeH—O)n-(SiMeC$_2$H$_4$C$_4$F$_9$—O)m-(SiMePh—O)O—SiMe$_2$-H; Me$_3$Si—O—(SiMeH—O)n-(SiMeC$_2$H$_4$CF$_3$—O)n-SiMe$_3$; Me$_3$Si—O—(SiMeH—O)n-(SiMeC$_2$H$_4$C$_4$F$_9$—O)m-SiMe$_3$; Me$_3$Si—O—(SiMeH—O)n-(SiMeC$_2$H$_4$CF$_3$—O)m-(SiMe$_2$-O)o-SiMe$_3$; Me$_3$Si—O—(SiMeH—O)n-(SiMeC$_2$H$_4$C$_4$F$_9$—O)m-(SiMe$_2$-O)o-SiMe$_3$; Me$_3$Si—O—(SiMeH—O)n-(SiMeC$_2$H$_4$CF$_3$—O)m-(SiMePh—O)O—SiMe$_3$; and Me$_3$Si—O—(SiMeH—O)n-(SiMeC$_2$H$_4$C$_4$F$_9$—O)m-(SiMePh—O)O—SiMe$_3$.

Commercially available hydrosilicones having a plurality of hydride groups include a hydride-terminated fluorosilicone that is commercially available under the trade designations "SYL-OFF Q2-7560" from Dow Corning Corp.

In certain embodiments the coated composition comprises the hydrosilylation reaction products of a fluoroalkyl silicone having at least two ethylenically unsaturated groups, and the hydrosilicone having at least two Si—H groups. The Si—H groups may be terminal, pendent, or a combination thereof. That is, at least one of the $R^6$ (H) in Formula IV, V, VI and VII is hydrosilylated with the ethylenically unsaturated groups of Formula I, II or III by hydrosilylation reaction.

The curable composition may optionally further comprise a mono (meth)acryloyl compound having a functional group. Such functional compounds have the general formula:

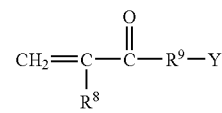

wherein $R^8$ is hydrogen, a $C_1$ to $C_4$ alkyl group, or a phenyl group, preferably hydrogen or a methyl group; $R^9$ is a divalent linking group that joins an (meth)acryloyl group to functional group Y and preferably contains up to 34, preferably up to 18, more preferably up to 10, carbon and, optionally, oxygen and nitrogen atoms. $R^5$ is preferably selected from —O—$R^{10}$— and —NH—$R^{10}$—, in which $R^{10}$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and Y is a functional group for improving the bonding or adhesion of the curable composition to a substrate. Preferably Y selected from the class consisting of hydroxyl, amino (including secondary and tertiary amino), carboxyl, isocyanato, aziridinyl, epoxy, acyl halide, azlactone, oxazolinyl, acetoacetyl, hydrolysable silanes (such as trialkoxy silanes) and cyclic anhydride groups. Such compounds are generally used in amounts of 10 parts by weight, based on 100 parts by weight of a mono (meth)acryloyl compound, polyethylenically unsaturated component and fluoroalkyl silicone component.

The fluoroalkyl silicone having a plurality of vinyl groups and the hydrosilicone having a plurality of Si—H groups react by hydrosilylation. Accordingly, at least one hydrosilylation catalyst (including photo-hydrosilylation catalysts) is included in curable compositions. Useful hydrosilylation catalysts include thermal catalysts (e.g., platinum catalysts), which are effective for catalyzing the hydrosilylation reaction between silicon-bonded hydrogen groups and silicon-bonded ethylenically unsaturated groups. Further details concerning thermal hydrosilylation catalysts may be found, for example, in U.S. Pat. No. 2,823,218 (Speier et al.); U.S. Pat. No. 2,970,150 (Bailey); U.S. Pat. Nos. 3,159,601 and 3,159,662 (Ashby); U.S. Pat. No. 3,220,972 (Lamoreaux); U.S. Pat. No. 3,516,946 (Modic); U.S. Pat. No. 3,814,730 (Karstedt); U.S. Pat. No. 4,029,629 (Jeram); U.S. Pat. No. 4,533,575 and U.S. Pat. No. 4,504,645 (Melancon); and U.S. Pat. No. 5,741,552 (Takayama, et al.); the disclosures of which are incorporated herein by reference.

Photoactivated hydrosilylation catalysts (i.e., photohydrosilylation catalysts) may also be used. Examples of hydrosilylation photocatalysts and methods of their use (e.g., photocuring conditions) may be found, for example, in U.S. Pat. Nos. 4,510,094 and 4,530,879 (Drahnak); U.S. Pat. No. 5,145,886 (Oxman et al.); U.S. Pat. No. 6,376,569 (Boardman et al.), and U.S. Pat. No. 6,451,869 (Butts), the disclosures of which are incorporated herein by reference. Combinations of the hydrosilylation catalysts and photocatalysts and/or curing methods may also be used. Photoactivated hydrosilylation, such as $PtCpMe_3$, do not begin the hydrosilylation reaction until exposed to UV light. As a consequence, the curable composition has shelf stability.

The catalyst is typically present in an amount that is effective to catalyze the hydrosilylation reaction. More typically, the catalyst is present in amounts sufficient to provide as little as one part of catalyst, or less, per million parts of the silicone having vinyl groups. On the other hand, amounts of the catalyst sufficient to provide as high as 1 to 10, or more, parts of catalyst per 1,000 parts of the silicone having vinyl groups may also be used.

The reaction product of a fluoroalkyl silicone having at least two ethylenically unsaturated groups, and a hydrosilicone having at least two Si—H groups are combined and cured using a free radical catalyst, preferably a UV catalyst. The dominant means of crosslinking is between the ethylenically unsaturated groups of the polyethylenically unsaturated component, and the unreacted ethylenically unsaturated groups of the fluoroalkyl silicone.

Alternatively, the fluoroalkyl silicone, the hydrosilicone having at least two Si—H groups, and the polyethylenically unsaturated components may be combined with a hydrosilylation catalyst to effect hydrosilylation, followed by addition of the free radical catalyst, then cured. The hydrosilylation will occur between hydrosilicone and the fluoroalkyl silicone, and between the hydrosilicone and the polyethylenically unsaturated component. However, due to the amount of polyethylenically unsaturated component used, free ethylenically unsaturated groups of the polyethylenically unsaturated component remain for subsequent free radical crosslinking.

To facilitate curing, polymerizable compositions according to the present invention may further comprise at least one free-radical thermal initiator and/or photoinitiator. Typically, if such an initiator and/or photoinitiator are present, it comprises less than about 5 parts by weight, more typically less than about 2 parts by weight, based 100 parts by weight of the polyethylenically unsaturated component, the hydrosilicone, the fluoroalkyl silicone. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.). Useful free-radical thermal initiators include, for example, azo, peroxide, persulfate, and redox initiators, and combinations thereof.

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, Miss., may be used in conjunction with photoinitiator(s) such as "IRGACURE 369".

If desired, the curable composition may further comprise an organic solvent. The organic solvent used in the free radical crosslinking reaction can be any organic liquid that is inert to the reactants and product, and that will not otherwise adversely affect the reaction. Suitable solvents include alcohols, such as methanol, ethanol and isopropanol, esters, such as ethyl acetate, aromatic solvents such as toluene, aliphatic hydrocarbon solvents such as heptane, chlorinated solvents, ethers, and ketones, such as acetone and methyl isobutyl ketone. Other solvent systems may also be used. The amount of solvent can generally be about 20 to 90 percent by weight of the total weight of reactants and solvent. It should be noted that in addition to solution polymerization, the crosslinking can be effected by other well-known techniques such as suspension, emulsion, and bulk polymerization techniques.

A variety of non-functional inorganic oxide particles can be used in the coating, in addition to the surface modified, ethylenically unsaturated inorganic particles. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat.

The inorganic oxide particles are typically colloidal, having an average particle diameter of about 0.001 to about 0.2 micrometers, less than about 0.05 micrometers, and less than about 0.03 micrometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter.

Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle.

The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.), the disclosure of which is incorporated by reference herein. Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particles is typically no more than 50 wt-% (dry weight), relative to the weight of the curable composition.

The compositions described herein are typically, thought not always, free of hydrophilic ingredients since the inclusion of such tends to reduce anti-soiling properties as well as stain certain media. Hydrophilic components are also susceptible to degradation upon exposure to aqueous based cleaning agents.

Those skilled in the art appreciate that the coating compositions can contain other optional adjuvants, such as, binders, surfactants, antistatic agents (e.g., conductive polymers), leveling agents, photosensitizers, ultraviolet ("UW") absorbers, stabilizers, antioxidants, lubricants, pigments, dyes, plasticizers, suspending agents and the like. Other components which may be added to the coating composition include those described in U.S. Pat. No. 6,730,388, which is incorporated by reference herein in its entirety.

The invention features an article comprising a substrate having a protective surface layer that comprises the cured coating composition. The coating provides the article with easy cleaning properties and protection against common stains, such as ink, shoe polish, food stains, and the like.

A variety of substrates can be utilized in the coated articles of the invention. Suitable substrate materials include hard substrates, such as vinyl, wood, ceramic, glass, masonry, concrete, natural stone, man-made stone, grout, metal sheets and foils, wood, paint, plastics, and films of thermoplastic resins, such as polyesters, polyamides (nylon), polyolefins, polycarbonates and polyvinylchloride, and the like. Polymeric materials, such as polyethylene terephthalate (PET), bisphenol A polycarbonate, cellulose triacetate, poly(methyl methacrylate), and biaxially oriented polypropylene which are commonly used in various optical devices. In certain embodiments, the composition may be used in optical display applications.

Typically the substrate will be chosen based in part on the desired optical and mechanical properties for the intended use. Such mechanical properties typically will include flexibility, dimensional stability and impact resistance. The substrate thickness typically also will depend on the intended use. For most applications, substrate thicknesses of less than about 0.5 mm are preferred, and more preferably about 0.02 to about 0.2 mm. Self-supporting polymeric films are preferred. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150.

As described is U.S. Patent Application Publication 2003/0217806, multilayer optical films provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 µm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

Further details of suitable multilayer optical films and related constructions can be found in U.S. Pat. No. 5,882,774 (Jonza et al.), and PCT Publications WO 95/17303 (Ouderkirk et al.) and WO 99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

The term "optical display", or "display panel", can refer to any conventional optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps, and switches. The exposed surface of such display panels may be referred to as a "lens." The invention is particularly useful for displays having a viewing surface that is susceptible to being touched or contacted by ink pens, markers and other marking devices, wiping cloths, paper items and the like.

The protective coatings of the invention can be employed in a variety of portable and non-portable information display articles. These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection television screens, computer monitors, notebook computer displays, instrument gauges, instrument panel covers, signage such as graphic displays and the like. The viewing surfaces can have any conventional size and shape and can be planar or non-planar, although flat panel displays are preferred. The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, road pavement markers (e.g. raised) and pavement marking tapes, overhead projectors, stereo cabinet doors, stereo covers, watch covers, as well as optical and magneto-optical recording disks, and the like.

In some embodiments, the protective coating is disposed on the display surface. In other embodiments, the protective coating is coated onto a substrate and employed as a protective film. The protective coating and substrate of the protective film preferably exhibits an initial haze of less than 2% and/or an initial transmission of at least 90%.

In some embodiments, high refractive index coating may be provided to a substrate using the curable compositions of the invention. High refractive index coatings are particularly desirable for many optical applications. Coatings having a refractive index of at least 1.6, comprising the curable composition of the invention, and surface modified zirconia nanoparticles as the polyethylenically unsaturated component are provided.

Zirconia nanoparticles will typically exhibit a particle size from 5-150 nm, or 5 to 75 nm, or 5 to 25 nm, or 5-15 nm. All or part of the polyethylenically unsaturated component may be surface modified zirconia nanoparticles. Zirconias for use in compositions of the invention are commercially available from Nalco Chemical Co. (Naperville, Ill.) under the product designation NALCO OOSSOO8, Buhler (Uzweil, Switzerland) under the product designation WO or WOS, or may be prepared as described in Applicant's copending application U.S. Ser. No. 11/027,426, filed Dec. 30, 2004, and incorporated herein by reference.

The substrate can be treated to improve adhesion between the substrate and the coating layer, e.g., by incorporating reactive groups into the substrate surface though chemical treatment, etc. If desired, an optional tie layer or primer can be applied to the substrate and/or hardcoat layer to increase the interlayer adhesion. Alternatively, the composition may further comprise a mono (meth)acryloyl compound having a functional group, wherein the functional group is chosen to improve adhesion to a specific substrate. For example, silyl functional groups, such as trialkoxysilane groups, may improve adhesion to glass substrates.

The coating composition can be applied to the substrate using a variety of conventional coating methods. Suitable coating methods include, for example, spin coating, knife coating, die coating, wire coating, flood coating, padding, spraying, roll coating, dipping, brushing, foam application, and the like. The coating is dried, typically using a forced air oven. The dried coating is at least partially and typically completely cured using an energy source.

Preferred energy sources include ultraviolet light curing devices that provide a UV "C" dosage of about 5 to 60 millijoules per square centimeter ($mJ/cm^2$). Preferably curing takes place in an environment containing low amounts of oxygen, e.g., less than about 100 parts per million. Nitrogen gas is a preferred environment.

Preferably the coating composition is applied at a sufficient amount to provide a cured layer having a thickness of at least about 10 nanometers, and preferably at least about 25 nanometers. Typically, the cured layer has a thickness of less than about 50 mils, preferably less than about 10 mils, and more preferably less than about 5 mils. The coated article may further comprise a layer of pressures sensitive adhesive. Thus, the present invention provides an adhesive article comprising a substrate bearing a coating of the curable composition on one major surface, and an adhesive layer on the other major surface. Suitable adhesive compositions include (e.g. hydrogenated) block copolymers such as those commercially available from Kraton Polymers of Westhollow, Tex. under the trade designation "Kraton G-1657", as well as other (e.g. similar) thermoplastic rubbers. Other exemplary adhesives include acrylic-based, urethane-based, silicone-based, and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

Further features and advantages of this invention are further illustrated by the following examples, which are in no way intended to be limiting thereof. The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

Various modifications and alterations to this invention will be apparent to those skilled in the art without departing from the spirit and scope of the invention. It should be understood that this invention is not intended to be unduly limited by the illustrative embodiments set forth herein and that such embodiments are presented by way of example only with the scope of the invention intended to be limited only by the claims which follow.

EXAMPLES

Method for Determining Marker Repellency:

For this test one of the Sharpie Permanent Marker, Vis-à-vis Permanent Overhead Project Pen or King Size Permanent Marker (all commercially available from Sanford, USA) were used as the marker. First, the tip of the selected marker was cut with a razor blade to provide a wide flat marking tip. Then, using the marker and an edge of a straight ruler as a guide, a straight line was drawn over the sample coatings applied over a PET substrate at an approximate speed of 15 cm per second. The appearance of the straight line drawn on the coatings was compared to the scale below, and a number was assigned to reflect the degree of repellency of the sample coating towards markers. An assigned number of 1 indicates excellent repellency while an assigned number of 5 indicates poor repellency. Depending on the type of marker used, the results are reported as Sharpie test, Vis-à-vis test or King marker test.

Method for Determining Solvent Resistance:

For this test, a drop (about 1.25 cm in diameter) of methyl ethyl ketone (MEK) or other organic solvent was placed on a sample coating applied over a PET substrate, and was allowed to dry at room temperature. Afterwards, the sample coating was visually observed for appearance and rated either as Haze (H), indicating poor solvent repellency or Clear (C), indicating good solvent repellency. Furthermore, using the above "method for marker test", the sharpie test was repeated on the spot where a drop of MEK or organic solvent repellency test was conducted, and a marker repellency number ranging from 1 to 5 was assigned.

Stain Resistance Test:

This test was similar to the solvent repellency test except that the sample coatings were applied over a polished granite or over a porous stone substrate and instead of MEK or an organic solvent a variety of stains selected from coffee, cool aid, red wine, grape juice, etc. were placed on the sample coatings. After 24 hours, the dried stains were removed by a soft wet or dry paper towel, depending on the stain. The residual stain marks were visually rated on a scale from 0 (no visible mark left) to 5 (severe mark left or dark stain which has spread).

Method for Measuring Contact Angle:

Contact angle measurements were made on the sample coatings using as-received reagent-grade hexadecane (obtained from Aldrich, St. Louis, Mo.) and de-ionized water filtered through a filtration system (obtained from Millipore Corporation, Billerica, Mass.), on a video contact angle analyzer (commercially available as product number VCA-2500XE from AST Products, Billerica, Mass.). Reported values are the averages of five measurements.

Steel Wool Test:

Steel wool test was run to determine the abrasion resistance of cured sample coatings. The abrasion resistance of the cured sample coatings was tested cross-web to the coating direction by use of a mechanical device capable of oscillating steel wool fastened to a stylus (by means of a rubber gasket) across the film's surface. The stylus oscillated over a 10 cm wide sweep width at a rate of 3.5 wipes/second wherein a "wipe" is defined as a single travel of 10 cm. The stylus had a flat, cylindrical geometry with a diameter of 1.25 inch (3.2 cm). The device was equipped with a platform on which weights were placed to increase the force exerted by the stylus normal to the film's surface. The steel wool was obtained from Rhodes-American, a division of Homax Products, Bellingham, Wash. under the trade designation "#0000-Super-Fine" and was used as received. A single sample was tested for each example, with 500 grams of applied load to the stylus and 300 wipes employed during testing.

Materials Used:

Q2-7785: A $C_4F_9$-containing fluorosilicone terminated with divinyl group, $CH_2$=$CHSiMe_2$-[$OSiMe_2$]y-[OSi(Me)($C_2H_4C_4F_9$)]x—$OSiMe_2CH$=$CH_2$ with hydrosilylation catalyst (80% solution in Heptane), obtained from Dow Corning, Midland, Mich.

Q2-7560: A fluorinated hydrosiloxane, $HMe_2Si$—[O—SiHMe]y'-[O—$SiMeC_2H_4C_4F_9$]x'-$OSiMe_2H$, obtained from Dow Corning, Midland, Mich.

C-2: A non-fluorinated hydrosiloxane containing the hydride terminated co-polymer of (methylhydro-phenylmethyl)siloxane in mole ratio of 45-50% to 50-55%, or H—(SiMePh—O)x-(SiHMe—O)y-SiMePh—H, with a MW of 2500-3000, obtained from Huls America Inc, Bristol, Pa.

MeFBSEA: $C_4F_9SO_2NMeCH_2CH_2OC(O)CH$=$CH_2$, available from 3M Company, St. Paul, Minn.

PFBEA: n-$C_4F_9CH_2CH_2OC(O)CH$=$CH_2$, was obtained from Daikin, Japan.

TMPTA: Trimethylolpropane triacrylate, commercially available under the trade designation "SR351", obtained from Sartomer Company, Exton, Pa.

SR-238: Hexanediol diacrylate, obtained from Sartomer Company, Exton, Pa.

SR-9036A: A highly ethoxylated bisphenol dimethacrylate (CAS# 41637-38-1), obtained from Sartomer Company, Exton, Pa.

CN-9002: An Aliphatic Urethane Acrylate, obtained from Sartomer Company, Exton, Pa.

SR444c: Pentaerythritol triacrylate, commercially available from Sartomer Company, Exton Pa.

906 HC: A silica based ceramer hardcoat with photoinitiators used in the examples was made as described in column 10, line 25-39 and Example 1 of U.S. Pat. No. 5,677,050 to Bilkadi, et al.

MIBK: Methyl isobutyl ketone, obtained from Aldrich, St. Louis, Mo.

$HCCl_3$: Trichloromethane, obtained from Aldrich, St. Louis, Mo.

401: $CF_3CF_2CF_2CF_2OCH_3$, available from 3M, St. Paul, Minn.

IPA: Isopropyl Alcohol, obtained from Aldrich, St. Louis, Mo.

MEK: Methyl ethyl ketone, obtained from EM Science, Gibbstown, N.J.

Acetone and Toluene were obtained from EMD Chemicals Inc.; Gibbstown, N.J.

(HFPO)a$CO_2CH_3$: $F(CF(CF_3)CF_2O)aCF(CF_3)CO_2CH_3$ with an average molecular weight of 1,200 g/mol, was prepared according to the method reported in U.S. Pat. No. 3,250,808 (Moore et al.), the disclosure of which is incorporated herein by reference, with purification by fractional distillation.

(HFPO)aC(O)—NH—CH$_2$CH$_2$—OH (MW~1229): (HFPO)a-C(O)OCH$_3$ (Mw=1200 g/mole, 50.0 g) was placed in 200 ml round bottom flask. The flask was purged with nitrogen and placed in a water bath to maintain a temperature of 50° C. or less. To this flask was added 2.55 g (0.042 mol) of 2-aminoethanol (obtained from Aldrich). The reaction mixture was stirred for about 1 hr, after which time an infrared spectrum of the reaction mixture showed complete loss of the methyl ester band at 1790 cm$^{-1}$ and the presence of the strong amide carbonyl stretch at 1710 cm$^{-1}$. Methyl t-butyl ether (MTBE, 200 ml) was added to the reaction mixture and the organic phase was extracted twice with water/HCl (~5%) to remove unreacted amine and methanol. The MTBE layer was dried with MgSO$_4$. The MTBE was removed under reduced pressure to yield a clear, viscous liquid. $^1$H Nuclear magnetic resonance spectroscopy (NMR) and infrared spectroscopy (IR) confirmed the formation of the above-identified compound.

HFPO: Mixture of 1 part Des N100, 0.15 parts (HFPO)$_x$C(O)NHCH$_2$CH$_2$OH and 0.85 parts SR-444C. Prepared by mixing 9.55 g (50 meq.) Des N100, 9.22 g ((MW~1229, 7.5 meq.) (HFPO)$_x$C(O)NHCH$_2$CH$_2$OH, (21.0 g 42.5 meq.) SR444c, 80 g ethyl acetate and 5 drops of dibutyltin dilaurate under nitrogen in a 240 ml bottle with a magnetic stir bar. A cloudy solution was obtained. The bottle was sealed, and the reaction was carried out at 70° C. for 5 hours. A clear homogeneous 33% solids solution was obtained. FTIR analysis showed no unreacted —NCO signal.

N100: DES N100 or Desmodur™ N100, Hexamethylene diisocyanate biuret, was obtained from Bayer Polymers LLC, of Pittsburgh, Pa.

EtOAc: Ethyl Acetate, obtained from Aldrich, St. Louis, Mo.

D-1173: 2-Hydroxy-2-methyl-1-phenyl-1-propanone, a UV photoinitiator, available from Ciba Specialty Product6s, of Tarrytown, N.Y.

Platinum-divinyltetamethydisiloxane complex: obtained from Gelest, Inc.

Examples 1-25 and Comparative Examples A to E

Examples 1-25 were made by preparing and coating compositions according to the invention on a variety of substrates (unless indicated otherwise PET substrates), followed by UV-curing of the coatings and then measuring the properties of the resulting coatings. The compositions of the Examples 1-25 were prepared by mixing a solution containing a polyethylenically unsaturated compound having two or more ethylenically unsaturated, free-radically polymerizable groups (20% in a solvent as indicated) with an additive solution containing a mixture of a fluorochemical silicone such as vinyl silicone and a hydrosilicone. The solution containing the polyethylenically unsaturated compound having two or more ethylenically unsaturated, free-radically polymerizable groups is referred to hereinafter as hardcoat agent solution. The additive solution identified as F1 was an 8% solution of a mixture of Q2-7785 and Q2-7560 at 90:10 weight ratio in hexane. The additive solution identified as F2 was an 8% solution of a mixture of Q2-7785 and Q2-7560 at 87.5:12.5 weight ratio in hexane. The additive solution identified as F3 was a 14% solution of a mixture of Q2-7785 and C2 at 90:10 weight ratio in hexane. The additive solution identified as F4 was an 8% solution of a mixture of Q2-7785 and C2 at 75:25 weight ratio in hexane. When the hardcoat agent solution contained more than one solvent expressed as (Solvent 1:Solvent 2) the ratio of solvents was 4:1 by weight. If the Solvent 1 and Solvent 2 were IPA and MEK, then the ratio of IPA to MEK was 1:1 by weight. Unless otherwise noted, the hardcoat agent solution contained about 1% of a photoinitiator (D-1173, unless indicated otherwise). In some cases, extra hydrosilylation catalyst, platinum-divinyltetamethydisiloxane complex (100 ppm), was added to the coating formulation for sufficient hydrosilylation. Once a uniform mixture of the hardcoat agent solution and the additive solution was obtained, the resulting compositions were coated on a substrate by spreading the coating composition on the substrate by means of a rotating rod. The "gauge" of the rod combined with the properties of the coating composition determined the coating thickness. Unless indicated otherwise, a #10 rod was used for coating the coating compositions over the substrates. The substrate and the coating were then dried in an oven at about 120° C., for about 5 minutes and then UV-cured using a hydrogen bulb light source under nitrogen gas atmosphere at a travel speed of about 600 cm per minute. For Comparative Example A, similar coatings were prepared as for Examples 1-25, except that coating compositions did not contain any additive solution. For Comparative Examples B, similar coatings were prepared as for Examples 1-25, except that the additive solution was a solution of HFPO, referred to as S I below. For Comparative Examples C and D, similar coatings were prepared as for Examples 1-25, except that the additive solution was a solution of MeFBSEA and PFBEA, referred to as S2 and S3 below correspondingly. For Comparative Example E, similar coatings were prepared as for Examples 1-25, except that the additive solution F1 was used form the coatings without the addition of any polyethylenically unsaturated compound having two or more ethylenically unsaturated, free-radically polymerizable groups, and the coating was cured only by heating in oven. Table I below summarizes the compositions of Examples 1-25 and the Comparative Examples A-E.

TABLE I

Coating Compositions For Examples 1-24 and Comparative Examples A to E.

| Example: | Wt % Hardcoat Agent Solution: | Wt % Additive Solution: | Hardcoat Agent (in Solvent): | Additive: |
|---|---|---|---|---|
| 1 | 95.25 | 4.75 | 906 HC (IPA:MEK) | F1 |
| 2 | 91 | 9 | 906 HC (IPA:MEK) | F1 |
| 3 | 87 | 13 | 906 HC (IPA:MEK) | F1 |
| 4 | 83 | 17 | 906 HC (IPA:MEK) | F1 |
| 5 | 80 | 20 | 906 HC (IPA:MEK) | F1 |
| 6 | 77 | 23 | 906 HC (IPA:MEK) | F1 |
| 7 | 71 | 29 | 906 HC (IPA:MEK) | F1 |
| 8 | 99 | 1 | 906 HC (IPA:MEK) | F1 |
| 9 | 98 | 2 | 906 HC (IPA:MEK) | F1 |
| 10 | 96 | 4 | 906 HC (IPA:MEK) | F1 |
| 11 | 98 | 2 | 906 HC (IPA:MEK) | F2 |
| 12 | 95 | 5 | 906 HC (IPA:MEK) | F2 |
| 13 | 97 | 3 | 906 HC (IPA:MEK) | F3 |
| 14 | 98.5 | 1.5 | 906 HC (IPA:MEK) | F3 |
| 15 | 97 | 3 | TMPTA (IPA:MEK) | F3 |
| 16 | 98.5 | 1.5 | TMPTA (IPA:MEK) | F3 |
| 17 | 83 | 17 | 906 HC (IPA:MEK) | F4 |
| 18 | 98.8 | 1.2 | SR-238 (EtOAc) | F1 |
| 19 | 98.8 | 1.2 | SR-9036A (EtOAc) | F1 |
| 20 | 98.8 | 1.2 | TMPTA (EtOAc) | F1 |
| 21 | 98.8 | 1.2 | CN-9002 (EtOAc) | F1 |

TABLE I-continued

Coating Compositions For Examples 1-24 and Comparative Examples A to E.

| Example: | Wt % Hardcoat Agent Solution: | Wt % Additive Solution: | Hardcoat Agent (in Solvent): | Additive: |
|---|---|---|---|---|
| 22 | 98.8 | 1.2 | TMPTA (EtOAc) | F1 |
| 23 | 96 | 4 | 906 HC (IPA:MEK) | F2 |
| 24 | 96 | 4 | TMPTA (IPA:MEK) | F3 |
| Comparative A | 100 | 0 | 906HC (IPA:MEK) | — |
| Comparative B | 99 | 1 | 906HC (IPA:MEK) | S1 |
| Comparative C | 95 | 5 | 906HC (IPA:MEK) | S2 |
| Comparative D | 90 | 10 | 906HC (IPA:MEK) | S3 |
| Comparative E | None | 100 | None | F1 |

Marker repellency of coatings obtained from the coating compositions according to the invention was determined using the method for determining marker repellency as described above. Table II below summarizes the results of the marker repellency test for coating compositions of this invention on a variety of substrates in comparison to known coating compositions of Comparative Examples A, C and D.

TABLE II

Marker Repellency Test Data for Coatings:

| Example: | Substrate: | Comments on Coatings: | Sharpie Test: | Vis-à-Vis Test: | King Size Test: |
|---|---|---|---|---|---|
| 1 | PET | Good/Hard | 1 | 1 | — |
| 2 | PET | Good/Hard | 1 | 1 | — |
| 3 | PET | Good/Hard | 1 | 1 | — |
| 4 | PET | Good/Hard | 1 | 1 | — |
| 5 | PET | Good/Hard | 1 | 1 | — |
| 6 | PET | Good/Hard | 1 | 1 | — |
| 7 | PET | Good/Hard | 1 | 1 | — |
| 9 | Vinyl | Good | 1 | — | 1 |
| 9 | Aluminum | Good | 1 | — | 1 |
| 9 | Polished Marble | Good | 1 | — | 1 |
| 9 | Porous Stone | Nonuniform | — | — | — |
| 10 | Vinyl | OK | 1 | — | 1 |
| 10 | Aluminum | Good | 1 | — | 1 |
| 10 | Polished Marble | Good | 1 | — | 1 |
| 10 | Porous Stone | Nonuniform | 2 | — | 2 |
| 11 | Vinyl | Good | 1 | 1 | 1 |
| 11 | Stainless Steel | Good | 1 | 1 | 1 |
| 11 | Hardwood | Good | 1 | 1 | 1 |
| 11 | Polished Marble | Good | 1 | 1 | 1 |
| 11 | Porous Stone | Nonuniform | 1 | 1 | 1 |
| 12 | Vinyl | Good | 1 | 1 | 1 |
| 12 | Stainless Steel | Good | 1 | 1 | 1 |
| 12 | Hardwood | Good | 1 | 1 | 1 |
| 12 | Polished Marble | Good | 1 | 1 | 1 |
| 12 | Porous Stone | Nonuniform | 1 | 1 | 1 |
| 13 | PET | OK | 1 | 1 | 1 |
| 14 | PET | Good | 1 | 1 | 1 |
| 14 | Stainless Steel | Good | 1 | 1 | 1 |
| 14 | PMMA | Good | 1 | 1 | 1 |
| 15 | PET | Good | 1 | 1 | 1 |
| 16 | PET | Good | 1 | 1 | 1 |
| 16 | Stainless Steel | Good | 1 | 1 | 1 |
| 17 | PET | Good/Soft | 1 | 1 | — |
| 18 | PET | Good | 1 | 1 | 1 |
| 18 | Stainless Steel | Good | 2 | 1 | 2 |
| 19 | PET | Nonuniform | — | — | — |
| 19 | Stainless Steel | Nonuniform | — | — | — |
| 20 | PET | Good | 1 | 1 | 1 |
| 20 | Stainless Steel | Good | 1 | 1 | 1 |
| 20 | Aluminum | Good | 1 | 1 | 1 |
| 20 | PMMA | Good | 1 | 1 | 1 |
| 21 | PET | Good | 5 | 1 | 4 |
| 21 | Stainless Steel | Good | 5 | 1 | 5 |
| 22 | PET | Good | 1 | 1 | 1 |

TABLE II-continued

Marker Repellency Test Data for Coatings:

| Example: | Substrate: | Comments on Coatings: | Sharpie Test: | Vis-à-Vis Test: | King Size Test: |
|---|---|---|---|---|---|
| 22 | Stainless Steel | Good | 1 | 1 | 1 |
| 22 | PMMA | Good | 1 | 1 | 1 |
| Comparative A | PET | Soft/Good | 5 | 5 | 5 |
| Comparative A | Vinyl | Soft/Good | 5 | 5 | 5 |
| Comparative A | Aluminum | Soft/Good | 5 | 5 | 5 |
| Comparative A | Polished Marble | Soft/Good | 5 | 5 | 5 |
| Comparative A | Porous Stone | Soft/Good | 5 | 5 | 5 |
| Comparative C | PET | Good | 5 | 5 | 5 |
| Comparative D | PET | Good | 5 | 5 | 5 |

Contact angle data for coatings obtained from the coating compositions according to the invention was determined using the method for determining contact angle as described above. Table III below summarizes the contact angle data for the hard coatings formed as described above from compositions according to the invention.

TABLE III $H_2O$/Oil Contact Angle for Coatings:

| | $H_2O$ Contact Angle (in Degrees): | | Oil Contact Angle (in Degrees): | |
|---|---|---|---|---|
| Example: | Advance | Recede | Advance | Recede |
| 1 | 109 | 90 | 52 | 34 |
| 2 | 107 | 86 | 42 | 29 |
| 3 | 105 | 86 | 38 | 29 |
| 4 | 107 | 90 | 35 | 32 |
| 5 | 107 | 90 | 35 | 29 |
| 6 | 110 | 92 | 37 | 32 |
| 7 | 110 | 93 | 43 | 29 |
| 17 | 112 | 96 | 49 | 29 |
| Comparative E | 120 | 86 | 50 | 29 |
| Comparative B | 109 | 86 | 67 | 55 |
| Comparative C | 73 | 53 | 27 | 7 |
| Comparative D | 70 | 52 | 12 | 3 |

Solvent repellency of coatings obtained from the coating compositions according to the invention was determined using the method for determining solvent repellency as described above. Table IV below summarizes the results of the solvent repellency test for coating compositions of this invention on PET substrates.

TABLE IV

Solvent Repellency Test Data for Coatings:

| | Solvent | | | | | |
|---|---|---|---|---|---|---|
| Example: | IPA | Toluene | MIBK | Acetone | EtOAc | MEK |
| 1 | — | — | — | — | — | C/1 |
| 2 | C/1 | C/1 | C/1 | C/1 | C/1 | C/1 |
| 3 | C/1 | C/1 | C/1 | C/1 | C/1 | C/1 |
| 4 | C/1 | C/1 | C/1 | C/1 | C/1 | C/1 |
| 5 | C/1 | C/1 | C/1 | C/1 | C/1 | C/1 |
| 6 | C/1 | C/1 | C/1 | C/1 | C/1 | C/1 |
| 7 | — | — | — | — | — | C/1 |
| 9 | C/1 | C/1 | C/1 | C/1 | C/1 | — |
| 10 | C/1 | C/1 | C/1 | C/1 | C/1 | — |
| 17 | — | — | — | — | — | C/1 |
| Comparative A | — | — | — | — | — | C/1 |
| Comparative B | — | — | — | — | — | C/1 |

Stain repellency of coatings obtained from the coating compositions according to the invention was determined using the method for determining stain repellency as described above. Table V below summarizes the results of the stain repellency test for coating compositions of this invention on PET substrates.

TABLE V

Stain Repellency Test Data For Coatings:

| | | | Treatment Composition | | |
|---|---|---|---|---|---|
| Substrate: | Stain* | Untreated | Example 10 | Example 24 | Example 25 |
| Polished Marble | MO | 5 | 0 | 0 | 0 |
| | TF | 5 | 0 | 0 | 0 |
| | CO | 5 | 0 | 0 | 0 |
| | Cola | 5 | 0 | 0 | 0 |
| | KoolAid | 5 | 0 | 0 | 0 |
| | RedWine | 5 | 0 | 0 | 0 |
| | GrapeJuice | 5 | 0 | 0 | 0 |
| | Coffee | 5 | 0 | 0 | 0 |
| Porous Stone | MO | 5 | 0 | 0 | 0 |
| | TF | 5 | 0 | 0 | 0 |
| | CO | 5 | 0 | 0 | 0 |
| | Cola | 5 | 0 | 0 | 0 |
| | KoolAid | 5 | 0 | 0 | 0 |
| | RedWine | 5 | 1 | 1 | 1 |
| | GrapeJuice | 5 | 2 | 1 | 1 |
| | Coffee | 5 | 1 | 1 | 1 |

*MO is used 10W30 motor oil, CO is coin oil, TF is used Pennzoil ATF Automatic transmission fluid.

Several coatings obtained from the coating compositions according to the invention were subjected to a steel wool test as described above to determine their durability. The durability of the coatings were determined in terms of their visual appearance and marker repellency after the steel wool test. Table VI below summarizes visual coating appearance and the marker repellency of several coatings before and after steel wool testing.

TABLE VI

Visual Appearance and Marker Repellency Test Data for Coatings after Steel Wool Testing:

| | Coating Appearance | Sharpie Test | |
|---|---|---|---|
| Examples: | After Steel Wool Test | Before Steel Wool Test | After Steel Wool Test |
| 8 | No Scratch | 1 | 1 |
| 9 | No Scratch | 1 | 1 |

TABLE VI-continued

Visual Appearance and Marker Repellency Test
Data for Coatings after Steel Wool Testing:

| Examples: | Coating Appearance After Steel Wool Test | Sharpie Test Before Steel Wool Test | Sharpie Test After Steel Wool Test |
|---|---|---|---|
| 10 | Scratched after 100 Wipes | 1 | 1 |
| Comparative A | No Scratch | 5 | 5 |

What is claimed is:

1. A free-radically curable composition comprising:
   a) 80 to 99.5 parts by weight of a polyethylenically unsaturated component having at least two ethylenically unsaturated groups,
   b) a fluoroalkyl silicone having at least two ethylenically unsaturated groups,
   c) a hydrosilicone having at least two Si—H groups, the total of b) and c) being at least 0.5 parts by weight,
   d) a hydrosilylation catalyst, and
   e) a free radical polymerization catalyst.

2. The composition of claim 1 comprising:
   a hydrosilylation reaction product of the fluoroalkyl silicone having at least two ethylenically unsaturated groups, and the hydrosilicone having at least two Si—H groups.

3. The composition of claim 1 wherein the fluoroalkyl silicone is of the formula:

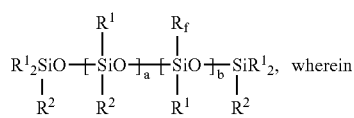

$R^1$ is a monovalent hydrocarbyl organic group;
$R^2$ is $R^1$ or an ethylenically unsaturated group Z;
$R_f$ is a fluoroalkyl group;
a is 0 to 2000
b is 1 to 2000;
a+b is at least 10,
wherein at least two of said $R^2$ groups are an ethylenically unsaturated group Z.

4. The composition of claim 3 wherein $R_f$ is of the formula $C_nF_{2n+1}(C_mH_{2m}O)_dC_pH_{2p}$—, or $C_nF_{2n+1}CHFCF_2(C_mH_{2m}O)_d C_pH_{2p}$— or $C_nF_{2n+1}OCHFCF_2(C_mH_{2m}O)_d C_pH_{2p}$— wherein n is an integer of 1 to 12, m is an integer of 1 to 12, d is 0 or 1, and p is an integer of 2 to 12.

5. The composition of claim 4 where n is 3 to 6.

6. The composition of claim 3 wherein Z is selected from alkenyl groups, alkynyl groups, vinyloxyalkylene, allyloxyalkylene, and (meth)acryloyl groups.

7. The composition of claim 3 wherein the fluoroalkyl silicone is of the formula:

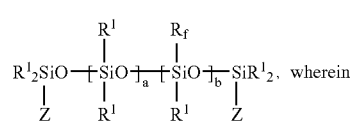

$R^1$ is a monovalent hydrocarbyl organic group;
Z is an ethylenically unsaturated group;
$R_f$ is a fluoroalkyl group;
a is 0 to 2000
b is 1 to 2000; and
a+b is at least 10.

8. The composition of claim 3 wherein the fluoroalkyl silicone is of the formula:

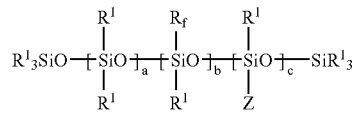

wherein Z is an ethylenically unsaturated group,
$R^1$ is a monovalent hydrocarbyl organic group;
$R_f$ is a fluoroalkyl group;
a is 0 to 2000
b is 1 to 2000;
c is 2 to 2000; and
a+b+c is at least 10.

9. The composition of claim 1 wherein said polyethylenically unsaturated component is of the formula
$R^4(Z')_p$, wherein $R^4$ is a non-urethane organic moiety of valency p, p is at least 2, and Z' is an ethylenically unsaturated polymerizable group, reactive with said ethylenically unsaturated group of said fluoroalkyl silicone.

10. The composition of claim 9 wherein $R^4$ is an aliphatic moiety of valency p.

11. The composition of claim 1 wherein said polyethylenically unsaturated component is an acrylated polyol.

12. The composition of claim 11 wherein said hydrosilicone having at least two Si—H groups is of the formula:

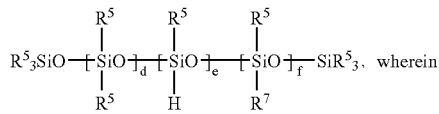

$R^5$ is a monovalent hydrocarbyl organic group,
$R^7$ is $R_f$ or $R^5$, where $R_f$ is a fluoroalkyl group;
d is 0 to 2000
e is 2 to 2000
f is 0 to 2000, and d+e+f is at least 10.

13. The composition of claim 1 wherein the hydrosilicone having at least two Si—H groups is of the formula:

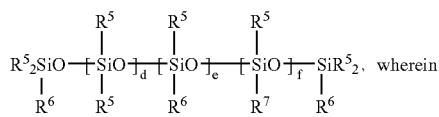

$R^5$ is a monovalent hydrocarbyl organic group,
$R^6$ is H or $R^5$
$R^7$ is $R_f$ or $R^5$, where $R_f$ is a fluoroalkyl group,
d is 0 to 2000
e is 1 to 2000
f is 0 to 2000, and d+e+f is at least 10, with the proviso that at least two of the $R^6$ groups are H.

14. The composition of claim 13 wherein said hydrosilicone having at least two Si—H groups is of the formula:

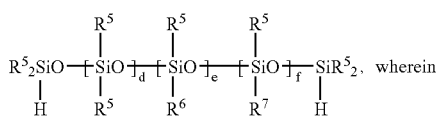

R⁵ is a monovalent hydrocarbyl organic group,
R⁶ is H or R⁵,
R⁷ is $R_f$ or R⁵, where $R_f$ is a fluoroalkyl group;
d is 0 to 2000
e is 1 to 2000
f is 0 to 2000, and d+e+f is at least 10.

15. The composition of claim 13 wherein said hydrosilicone having at least two Si—H groups is of the formula:

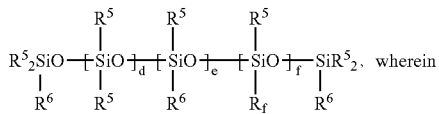

R⁵ is a monovalent hydrocarbyl organic group,
R⁶ is H or R⁵,
$R_f$ is a fluoroalkyl group;
d is 0 to 2000
e is 1 to 2000
f is 1 to 2000, and d+e+f is at least 10, with the proviso that at least two of the R⁶ groups are H.

16. The composition of claim 1 wherein said a polyethylenically unsaturated component comprises surface functionalized inorganic nanoparticles, having a plurality of ethylenically unsaturated groups.

17. The composition of claim 16, wherein said inorganic nanoparticles comprise a plurality of (meth)acryloyl surface functional groups.

18. The composition of claim 1, further comprising a mono (meth)acryloyl compound having a functional group.

19. The composition of claim 1 wherein the molar ratio of Si—H groups is less than or equal to the molar amount of ethylenically unsaturated groups of said fluoroalkyl silicone and the ethylenically unsaturated groups of the polyethylenically unsaturated component.

20. The composition of claim 1 wherein said polyethylenically unsaturated component comprises surface modified zirconia nanoparticles.

21. A method of providing a coating onto a substrate comprising the steps of:
a) coating a substrate with the composition of claim 1 and curing the coating with a hydrosilylation catalyst and a free radical initiator.

22. The method of claim 21 wherein composition comprises the reaction product of fluoroalkyl silicone having at least two ethylenically unsaturated groups, and the hydrosilicone having at least two Si—H, effected by the hydrosilylation catalyst.

23. The method of claim 21 wherein the coating is cured by UV.

24. The method of claim 21 wherein the substrate is selected from vinyl, wood, glass, stone, metals, ceramics, masonry, paint, plastics and thermoplastic resins.

25. A coated substrate comprising the cured composition of claim 1.

26. The coated substrate of claim 25, wherein the substrate is selected from vinyl, wood, glass, stone, metals, ceramics, masonry, paint, plastics and thermoplastic resins.

27. The coated substrate of claim 25 wherein said coating has an index of refraction of at least 1.6.

* * * * *

UNITED STATES PATENT AND TRADEMARK OFFICE
CERTIFICATE OF CORRECTION

PATENT NO. : 7,407,710 B2
APPLICATION NO. : 11/279803
DATED : August 5, 2008
INVENTOR(S) : Zai-Ming Qiu It is certified that error appears in the above-identified patent and that said Letters Patent is hereby corrected as shown below:

Column 2,
Line 43, after "groups" insert -- . --.

Column 3,
Line 37, delete "butentyl;" and insert -- butenyl; --.

Column 4,
Line 50, after "composition" insert -- . --.

Column 6,
Line 54, delete " $R_3SiO_{3/2}$ " and insert -- $R^1_3SiO_{1/2}$ --.

Column 7,
Line 20, delete "perfluoro-octanoyl" and insert -- perfluorooctanoyl --.
Line 21, after "Preparation" insert -- , --.
Line 21, after "Properties" insert -- , --.
Line 34, delete "napthyl." and insert -- naphthyl. --.
Line 36, delete "butentyl;" and insert -- butenyl; --.
Line 66, delete "cylic" and insert -- cyclic --.

Column 8,
Line 4, delete "RfCH" and insert -- $R_fCH$ --.

Column 9,
Line 36, delete "f is o" and insert -- f is 0 --.
Line 53, delete "f is o" and insert -- f is 0 --.

Column 10,
Line 10, delete "(SiHMe$_2$-O)" and insert -- (SiHMe-O) --.
Line 11, delete "(SiHMe$_2$-O)" and insert -- (SiHMe-O) --.
Line 24, delete "SiMe$_2$-O)O" and insert -- SiMe$_2$-O)o --.
Line 26, delete "SiMe$_2$-O)e" and insert -- SiMe$_2$-O)o --.
Line 28, delete "O—SiMe$_2$-H;" and insert -- o—SiMe$_2$-H; --.
Line 29, delete "O—" and insert -- o— --.
Line 30, delete "n-SiMe$_3$;" and insert -- m-SiMe$_3$; --.
Line 35, delete "O—" and insert -- o— --.
Line 37, delete "O—" and insert -- o— --.

UNITED STATES PATENT AND TRADEMARK OFFICE
CERTIFICATE OF CORRECTION

PATENT NO. : 7,407,710 B2
APPLICATION NO. : 11/279803
DATED : August 5, 2008
INVENTOR(S) : Zai-Ming Qiu It is certified that error appears in the above-identified patent and that said Letters Patent is hereby corrected as shown below:

Column 12,
Line 42, before "commercially" insert -- ( --.
Line 45, before "commercially" insert -- ( --.

Column 14,
Line 4, delete "("UW")" and insert -- ("UV") --.

Column 18,
Line 48, delete "SR444c:" and insert -- SR444C: --.

Column 19,
Line 25, delete "((MW" and insert -- (MW --.
Line 26, delete "(HFPO)$_x$C" and insert -- (HFPO)xC --.
Line 27, delete "SR444c," and insert -- SR444C, --.
Line 41, delete "Platinum-divinyltetamethydisiloxane" and insert
-- Platinum-divinyltetramethyldisiloxane --.

Column 20,
Lines 8 and 9, delete "platinum-divinyltetamethydisiloxane" and insert
-- Platinum-divinyltetramethyldisiloxane --.

Column 26,
Line 61, in Claim 13, after "R$^5$" insert -- , --.

Signed and Sealed this

Third Day of March, 2009

JOHN DOLL
*Acting Director of the United States Patent and Trademark Office*